United States Patent [19]

Syoji et al.

[11] 3,899,530

[45] Aug. 12, 1975

[54] CONTINUOUS CRYSTALLIZATION

[75] Inventors: Masaaki Syoji; Goro Ishihara; Masao Hirose, all of Mishima; Hidenobu Kubota; Naoyuki Mitani, both of Otsu, all of Japan

[73] Assignee: Toray Industries, Inc., Tokyo, Japan

[22] Filed: Dec. 11, 1972

[21] Appl. No.: 314,124

[30] Foreign Application Priority Data
Dec. 28, 1971 Japan.............................. 46-105709

[52] U.S. Cl................................. 260/525; 260/707
[51] Int. Cl... C07c 51/42; C07c 63/24; C07c 63/26
[58] Field of Search............................. 260/525, 707

[56] References Cited
UNITED STATES PATENTS

| | | | |
|---|---|---|---|
| 2,848,488 | 8/1958 | Himel et al. | 260/525 |
| 3,029,278 | 4/1962 | Spiller et al. | 260/707 |
| 3,497,552 | 2/1970 | Olsen | 260/525 |

*Primary Examiner*—Anton H. Sutto
*Assistant Examiner*—Richard D. Kelly

[57] ABSTRACT

Method of continuous crystallization of reacted solutes from solution in industrial quantities without formation of scale on the cooling surface. Controlled stirring limits the cooling of a supersaturated solution, providing superior crystal growth, using a Pe number in the range of about 0.1 to about 20.

4 Claims, 2 Drawing Figures

CONTINUOUS CRYSTALLIZATION

BACKGROUND OF THE INVENTION

This invention relates to a method for continuously crystallizing a crystallizable material from a solution.

In general, terephthalic acid and isophthalic acid, which are both crystallizable materials, are produced by reacting the raw materials in the presence of a solvent under an elevated pressure at a temperature higher than the boiling point of the solvent. The reaction mixture obtained by such a reaction contains solvent, unreacted raw materials and by-products in addition to the main product.

Many methods have been proposed for separating the product in a pure state from such a reaction mixture. When the product is crystallizable at a temperature higher than room temperature, the so-called "recrystallization method" is usually employed. The recrystallization method is carried out by heating a solution containing a crystallizable material until it completely dissolves and then gradually cooling it. On an industrial scale it is economically important to carry out this recrystallization continuously.

The kind of solvent used is determined by taking the solubility, economy of recovery, and safety in handling into consideration. In some cases, a solvent which can dissolve the crystallizable material under conditions of elevated pressure and a temperature higher than the boiling point is chosen as a suitable solvent in industrial practice.

Various methods have heretofore been proposed for industrially crystallizing a crystallizable material from a solution obtained by dissolution at a temperature higher than the boiling point of the solvent. In a typical method, the crystallization is carried out by cooling the solution in which is dissolved a crystallizable material under a high pressure by conducting the solution to a lower pressure system under adiabatic conditions to evaporate some of the solvent. In a typical apparatus for carrying out this method, a line for transferring the solution from the high temperature-high pressure system to the low temperature-low pressure system is necessary and a suitable valve must be provided on the line. In a practical embodiment according to this method, the temperature of the solution maintained at high temperature and high pressure decreases too quickly as soon as the solution passes through the valve, with the result that a large particle size of crystal cannot be obtained.

When the resulting crystals have small particle sizes, it is very difficult to separate the crystals from the solution.

For example, in a particular case in which this method was applied, an aqueous acetic acid solution of terephthalic acid containing 20 wt. % terephthalic acid solution, maintained at about 300° C under a pressure of 70 kg/cm$^2$ was vented to atmospheric pressure to undergo a quick cooling. The terephthalic acid crystals obtained by such a recrystallization method had very small particle sizes, and it was very difficult to separate the terephthalic acid crystals from the mother liquor by ordinary separation techniques, which made it commercially impractical or impossible to prepare a terephthalic acid of high purity. Overall, this method is not suitable for modern industrial practice.

In another conventional method, a solution in which is dissolved a crystallizable material at a high temperature is gradually cooled to prepare a large particle size of crystal, by charging the solution into a crystallizer equipped with a cooling jacket. There is a hitherto seemingly inescapable serious disadvantage of this method in that the crystallizable material deposits and grows on the cooling surface of the crystallizer to form so-called "scales," which results in making it impossible to carry out this method continuously, and also rendering the cooling efficiency poor.

SUMMARY OF THE INVENTION

An object of this invention is to provide an industrially feasible crystallization method useful for obtaining a large particle size of crystal continuously without forming "scales" on the crystallizer from a solution in which is dissolved a crystallizable material at a temperature higher than the boiling point of the solvent.

It has been found that the foregoing objects can be attained by providing a crystallizing chamber having a crystallizing zone and a cooling zone successively adjacent to it. The solution is continuously fed into, and the resulting crystal is continuously withdrawn from the crystallizer. The crystallizing zone is provided with a mixer. The mixing is of moderate speed and carefully contolled so as to give the solution a temperature gradient such that the temperature of the solution decreases gradually through the crystallization zone while approaching the cooling zone, while the removal of heat for crystallization is effected in the cooling zone.

This invention particularly relates to an improvement for obtaining large particles of crystal in a continuous manner without a formation of scales on cooling surfaces of the crystallizer. A supersaturated solution maintained under pressure and at a temperature higher than the boiling point of the solvent in which the crystallizable material is dissolved is charged into a crystallizer, and made to flow therethrough, and is cooled by passing through a zone maintained at a temperature lower than the saturation temperature. The resulting crystal is then taken off continuously out of the crystallizer at a point which is spaced apart from the charging location. The specific steps of this invention include (a) maintaining the pressure inside the crystallizer higher than the vapor pressure of the solution, (b) maintaining a continuous phase of the solution inside the crystallizer, (c) applying a cooling means effective upon a portion only of said crystallizer, thereby establishing a crystallizing zone and a cooling zone successively adjacent to one another therein and passing the solution successively through these zones, (d) maintaining the temperature of the cooling zone lower than the saturation temperature, and (e) slowly mixing the solution so that the solution has a temperature gradient such that the temperature of the solution decreases as it comes nearer to the cooling zone.

DESCRIPTION OF THE PREFERRED EMBODIMENTS

The term "crystallizable material" used in this application means a material which can be crystallized by cooling from a solution obtained by dissolving said material in a suitable solvent at a temperature higher than the boiling point thereof.

The term "saturation temperature" used in this specification is intended to mean a temperature at which the solution of a given composition is just saturated.

The term "slow mixing" used in this application is intended to mean a mixing in which the Pe Number (herein later defined) is within the range from about 0.1 to about 20.

The crystallizable material used in this invention includes, for example, aromatic carboxylic acids such as terephthalic acid and isophthalic acid. Terephthalic acid is most preferably used as the crystallizable material of this invention. Water, acetic acid, propionic acid, aqueous solutions of these acids, and those aqueous solutions containing a minority portion of ketones such as methyl ethyl ketone and cyclohexanone usually can be used as solvents for the crystallizable material of this invention.

A reaction mixture obtained by oxidizing p-xylene, m-xylene, or a mixture thereof by molecular oxygen in the presence of a metal catalyst in a solvent of an aliphatic acid such as acetic acid, propionic acid or an aqueous solution of such acid, can be suitably employed as the solution in which is dissolved a crystallizable material at a temperature higher than the boiling point of the solvent.

Figure 1:
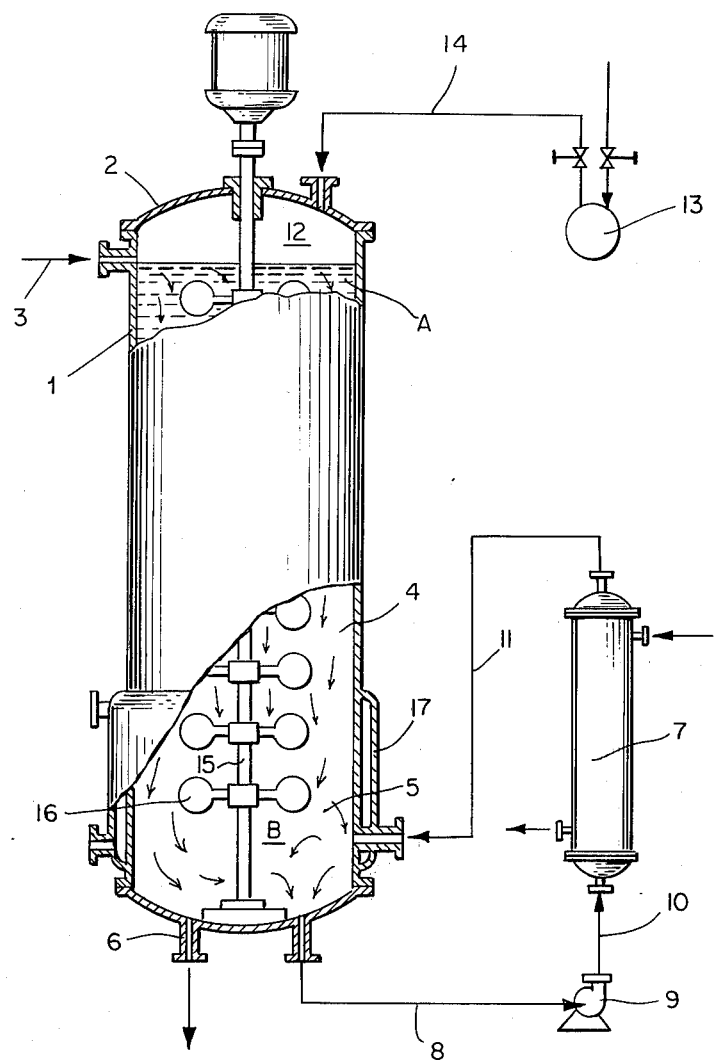
FIG. 1 is a partially cross-sectioned schematic drawing of typical apparatus used in practicing a preferred embodiment of the method of the present invention.

Referring to the drawings showing a particular embodiment in which the method of this invention is carried out, the continuous crystallization according to this invention is now described. In FIG. 1, crystallizer 1 is constructed as a cylindrical vessel. The solution in which is dissolved a crystallizable material is charged into the crystallizer from the upper end 2 thereof through line 3. The charged solution fills the space 4 inside the crystallizer 1 and is usually taken out of the lower end 5 of crystallizer 1 through line 6 as a slurry.

In the space 4 inside the crystallizer 1, a continuous phase consisting of the charged solution is formed. This continuous phase is divided into two zones, one being a crystallizing zone A in which the temperature of the solution decreases gradually as it descends, and the other being the cooling zone B in which a slurry maintained at a temperature below the saturation temperature thereof is present. The heat of the hot solution which was charged into the crystallizer is removed by a cooling zone B.

This removal of heat may be conducted by the cooling jacket 17 surrounding the cooling zone, but preferably by the following method. Namely, part of the slurry is taken out of the crystallizer 1 and then introduced into the heat exchanger 7 through line 8, pump 9, and line 10; cooled there; and thereafter the cooled slurry is recycled to the cooling zone B through line 11. Accordingly, cooling is completely accomplished. In this method portions of the crystallizable material present in the slurry can be separated out in any suitable place of lines 8, 10 or 11. In that case the line 6 can be omitted.

It is quite significant that the crystallizing zone A is formed in direct contact with the cooling zone B. Since the solution at a high temperature is continuously charged into the crystallizer 1 from the upper end 2 thereof, the solution present in the crystallizing zone A has a temperature gradient such that the temperature of the solution decreases as it comes nearer to the cooling zone B because of a slow mixing given to the solution.

It is indispensable in this invention to give such a temperature gradient to the solution present in the crystallizing zone A. In this invention there is no limitation on the method by which the solution is given the slow mixing. For example, it may be conducted either by rotation or up-and-down motion of the impellers shown in FIG. 1 or by discharging a gas which cannot be condensed in the solution from the lower part of the crystallizing zone.

In general, the degree of mixing can be represented by Peclet's Number (hereinafter Pe Number).

The Pe Number, as used in this invention, is calculated as $UL/E$ wherein $U$ represents the average linear velocity (in units of cm/sec) of the solution in the crystallizing zone, $L$ represents the length (in cm) of the crystallizing zone, and $E$ represents the longitudinal dispersion coefficient of the solution in cm$^2$/sec. The value $E$ can be measured by a tracer response measurement, for example, the method described in Chemie-Ing.-Techn. 29 727 (1957).

Figure 2:
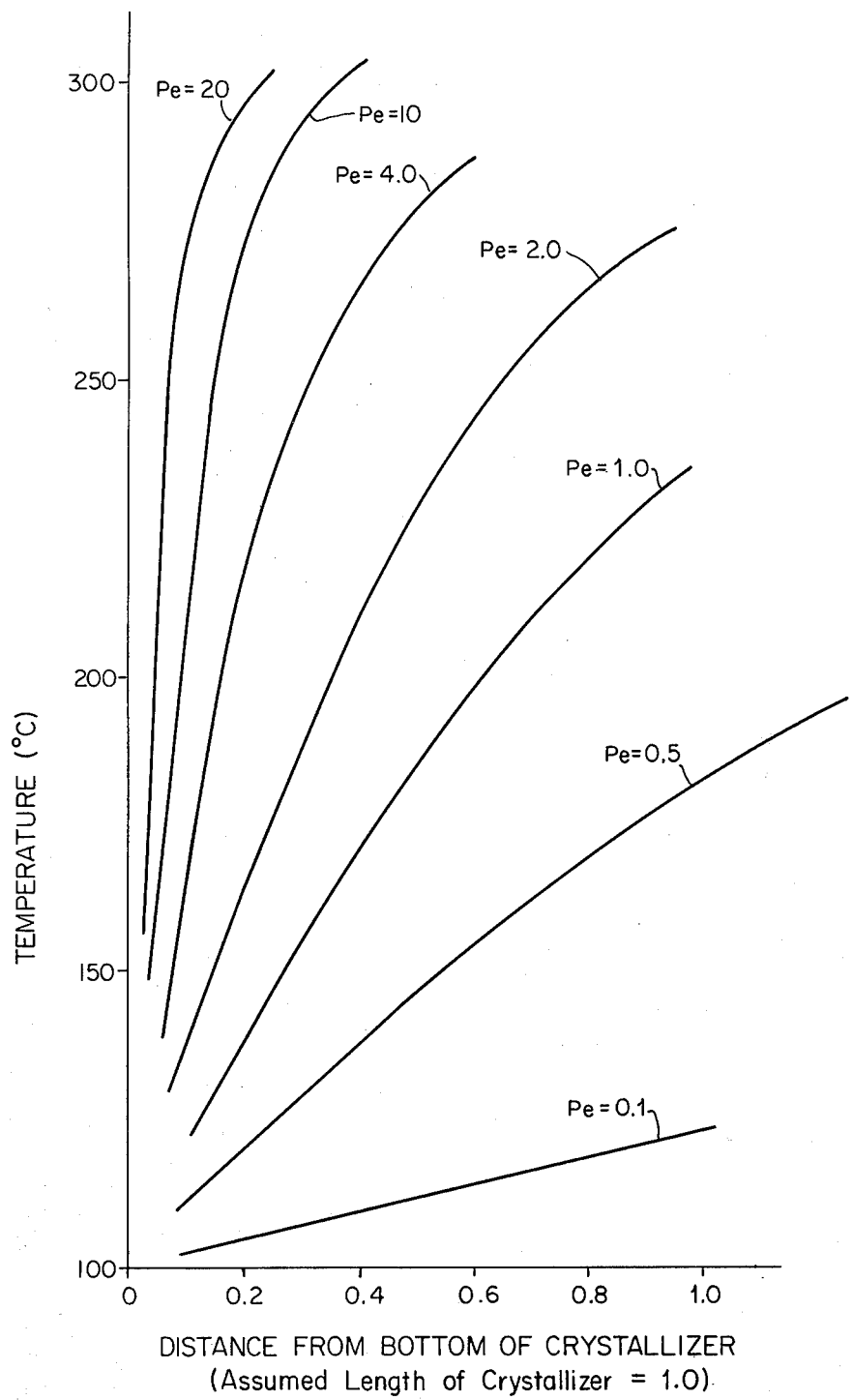
FIG. 2 is a graph showing the vertical temperature gradient for selected representative values of Peclet's number for the crystallizer used in an example of a preferred embodiment of the present invention.

It is shown in FIG. 2 how, where the input temperature of the charged solution is 310° C and where the temperature approaches 100° C near the bottom of the crystallizing zone, the temperature of solution at every distance from the top of the crystallizing zone depends upon the Pe Number. It is apparent from FIG. 2 that the temperature gradient in the crystallizing zone becomes steeper as the Pe Number becomes greater. The slope of the temperature gradient greatly affects the growth rate of the crystal; therefore a suitable range of Pe Number must be determined for obtaining a large particle size of crystal.

In this invention a slow mixing in which the Pe Number lies within the range from about 0.1 to about 20, preferably from about 0.5 to about 20, still preferably from about 0.5 to about 5, should be given to the solution present in the crystallizing zone. When the Pe Number is lower than about 0.1, the solution has a very low temperature even at the top of the crystallizing zone; therefore the solution undergoes quick cooling as soon as it is introduced into the crystallizing zone. When the Pe Number is greater than about 20, the solution has a high temperature even at the bottom of the crystallizing zone; therefore the solution undergoes a quick cooling as it comes into the cooling zone.

In this invention a solution in which is dissolved crystallizable material at a high temperature is gradually cooled as it flows through the crystallizer thereby forming crystals in the crystallizing zone and the crystals thus formed at once grow slowly as they move in a restricted space caused by the slow mixing mentioned above.

A cylindrical vessel is preferably used as the crystallizer in this invention. A crystallizer whose cross-section varies in the vertical direction also may be used. By using such a crystallizer the Pe Number of the solution can be changed in the vertical direction A solution in which all the crystallizable material is dissolved at a high temperature is most preferably used in this invention, but a solution containing some parts of the crystallizable material in a crystal state also may be used. In the latter case the crystals present from the start act as seeds for crystallization.

The pressure in the crystallizer should be maintained higher than the vapor pressure of the solution; otherwise the solvent is vaporized, cooling the solution, which results in making it impossible to give a controlled cooling to the solution.

In this invention it is preferred to take the slurry out of the crystallizer completely or to feed the cooled slurry back to the crystallizer in the cooling zone at a point situated far from the crystallizing zone.

According to this invention, it is possible continuously to obtain a large particle size of crystal without formation of "scales" on the crystallizer from a solution in which is dissolved a crystallizable material at a temperature higher than the boiling point of the solvent. In cases where this invention is applied to a solution of terephthalic acid, a large particle size terephthalic acid crystal can be obtained continuously in high purity. The following examples are given to illustrate the improvement attained by the crystallization process of this invention.

EXAMPLE 1

A solution maintained at 275° C under 40 kg/cm$^2$ consisting of 80 wt. % of acetic acid, 10 wt. % of water, and 10 wt. % of terephthalic acid was charged at the flow rate of 50 kg/hr into the crystallizer 1 shown in FIG. 1 whose diameter is 0.18 meter, wherein the lengths of the crystallizing zone and the cooling zone are 1.7 meter and 0.3 meter respectively, from the upper end 2.

The pressure in the crystallizer was maintained at 40 kg/cm$^2$ by connecting a nitrogen gas "bomb" 13 to the upper part of the crystallizer 12 by line 14,. The agitator 15 was provided with fifteen turbine impellers 16 whose diameters were 8 cm at every distance of 12 cm.

The agitator was rotated at a speed of 100 r.p.m. The solution was mixed slowly at a value of 2.0 Pe Number by this rotation of the agitator.

Part of the solution present in the cooling zone B was taken off and introduced into the heat exchanger 7 provided separately from the crystallizer 1. The resulting cooled solution was fed back to the cooling zone B.

The heat exchanger 7 has a heat transfer surface of 1 square meter and water at 30° C was used as a cooling medium in the heat exchanger. By such cooling, the solution present in the cooling zone was maintained at 60° C. The crystals of terephthalic acid thus obtained had an average diameter of 150$\mu$. The overall heat transfer coefficient was 500 K cal/m$^2$ hr. °C at the start of the operation and 400 K cal/m$^2$ hr. °C after a month's operation. However, the crystallization process could still be carried out smoothly and stably even after a month's continuous operation.

The following comparative example was conducted by using the crystallizer provided with a cooling jacket surrounding all the external wall thereof.

The agitator was rotated at a speed of 100 r.p.m. to give the mixing Pe Number 2.0 to the solution. The solution, maintained at 275° C under 40 kg/cm$^2$, consisting of 80 wt. % of acetic acid, 10 wt. % of water, and 10 wt. % of terephthalic acid was charged at the flow rate of 50 kg/hr into the crystallizer. The crystallizer was filled with the solution and was pressurized at 40 kg/cm$^2$ by nitrogen gas.

Cooling was accomplished by introducing a cooling medium at 30° C into the cooling jacket. In this method, the slurry at about 60° C consisting of the solvent and terephthalic acid crystal was taken out of the bottom of the crystallizer.

The terephthalic acid crystal thus obtained had an average diameter of 150$\mu$. However, after only two hours' operation, so-called "scales" deposited and grew on the inner wall of the crystallizer and further operation was impossible.

EXAMPLE 2

Some runs of crystallization were carried out in the same manner as in Example 1, except that the rotating speed of the agitator was changed, as shown in the following Table 1. The average particle size of terephthalic acid in diameter thus obtained is shown in Table 1.

Table 1

| Rotating Speed of Agitator (r.p.m.) | Pe Number | Average Particle Size ($\mu$) |
|---|---|---|
| 430 | 0.3 | 50 |
| 310 | 0.5 | 110 |
| 170 | 1 | 140 |
| 60 | 5 | 150 |
| 35 | 10 | 100 |

The following is claimed:

1. In a continuous method where a supersaturated solution of a crystallizable aromatic carboxylic acid selected from the group consisting of terephthalic acid and isophthalic acid in a solvent selected from the group consisting of water, lower aliphatic carboxylic acid selected from the group consisting of acetic acid and propionic acid, and mixtures thereof, and at a temperature higher than the boiling point of the solvent, is charged into an elongated crystallizer and in the course of such flow is cooled to a temperature lower than the saturation temperature, and then the resulting crystals are taken continuously out of the crystallizer, the improvement comprising the steps of:
    a. maintaining a pressure in the crystallizer which is higher than the vapor pressure of the incoming hot solution;
    b. maintaining the solution inside the crystallizer as a continuous phase;
    c. applying a cooling means effective upon a portion only of said crystallizer, thereby establishing a crystallizing zone and a cooling zone successively adjacent to one another therein, and passing the solution successively through these zones;
    d. maintaining the temperature of the cooling zone lower than the saturation temperature of the solution;
    e. mixing the contents within said crystallizing zone; and
    f. limiting the extent and rate of said mixing to a Pe number within the range of about 0.1 to about 20 so that the solution therein has a temperature gradient such that the temperature of the solution decreases as it nears the cooling zone.

2. The method of claim 1 wherein the temperature of the cooling zone is maintained at a temperature lower than the saturation temperature of the solution by a method wherein part of the solution present in the cooling zone is withdrawn from the crystallizer, any crystals in the withdrawn solution are removed, if necessary, and then fed back to the cooling zone.

3. The process of claim 1 wherein the Pe Number is within the range from about 0.5 to about 5.

4. The process of claim 1 wherein the mixing is effected in the crystallizing zone by rotation of impellers.

* * * * *